Oct. 2, 1928. A. E. SMALL Re. 17,095

METAL STRUCTURE FOR RAILWAY CARS
Original Filed Oct. 19, 1922 3 Sheets-Sheet 1

Inventor
Arthur E. Small
Vinton E. Sisson
Attorney

Oct. 2, 1928. A. E. SMALL Re. 17,095

METAL STRUCTURE FOR RAILWAY CARS
Original Filed Oct. 19, 1922 3 Sheets-Sheet 2

Inventor
Arthur E. Small
Vinton E. Sisson,
Attorney

Oct. 2, 1928. A. E. SMALL Re. 17,095

METAL STRUCTURE FOR RAILWAY CARS
Original Filed Oct. 19, 1922 3 Sheets-Sheet 3

Inventor
Arthur E. Small
Linton E. Sisson
Attorney

Reissued Oct. 2, 1928. Re. 17,095

UNITED STATES PATENT OFFICE.

ARTHUR E. SMALL, OF CHICAGO, ILLINOIS, ASSIGNOR TO UNION METAL PRODUCTS COMPANY, OF CHICAGO, ILLINOIS, A CORPORATION OF DELAWARE.

METAL STRUCTURE FOR RAILWAY CARS.

Original No. 1,638,172, dated August 9, 1927, Serial No. 595,634, filed October 19, 1922. Divided and application filed January 3, 1927. Serial No. 158,595. Application for reissue filed June 15, 1928. Serial No. 285,651.

It is to be understood that the invention is not limited to the exact details of construction shown and described, as it is obvious that various modifications thereof within the scope of the claims will occur to persons skilled in the art.

My invention relates to the construction of railway cars and more particularly to metal end structures or walls for railway cars made of one or more metallic plates or panels formed with integral reinforcing, stiffening and bracing embossments or corrugations. However, this device may be incorporated in the construction of car side walls. floors, roofs or doors used in connection with railway cars of various types.

It is well known that the end walls of railway cars are more likely to be broken or otherwise injured than the side walls. This is due to the inertia thrusts and pressures caused by the shifting of the cargoes when the train starts or stops. These thrusts may be local, tending to distort the end in some particular spot, as, for example, when a piece of piping or lumber shifts lengthwise imparting a blow against the end wall of the car; or there may be a general tendency to break out the end wall as a whole or tear it away from the framing. For the purpose, therefore, of greater strength and durability, car ends have been constructed of metal plates corrugated or formed with ribs to impart the desired strength, rigidity and resiliency.

One of the principal objects of my invention is to provide a corrugated metallic end structure for railway cars in which the corrugations have a configuration and arrangement that impart to the structure a maximum capacity for resisting cargo thrusts, both local and general, static or quiescent, and with sufficient resiliency to prevent permanent distortion, due to the thrusts of the loads, with a minimum weight of metal. It is important that structures of this sort should be as light as is possible, consistent with strength and durability, both for reasons of economy in manufacturing cost and also to keep the weight of the car at a minimum.

A further object is to provide a corrugated metallic wall element that is practically possible to manufacture. A further object is to provide a metallic wall element with corrugations that resist to a greater degree torsional stresses, as well as brace the element, and the car end against diagonal side thrusts or weaving.

Another object is to form a metallic plate with integral corrugations or ribs which impart to it a certain amount of strength and rigidity to resist loads imposed thereon and to so form the ends of the corrugations or ribs as to provide a certain amount of resiliency to enable the plate to deflect and return to its normal position without appreciable amount of permanent distortion.

In the drawings:

Fig. 7 is a section on line 7—7 of Fig. 5.

Fig. 8 is a section on line 8—8 of Fig. 5.

Fig. 9 is a section on line 9—9 of Fig. 5.

Fig. 18 is a section on line 18—18 of Fig. 16.

Fig. 19 is a section on line 19—19 of Fig. 16.

Fig. 20 is a section on line 20—20 of Fig. 16.

Fig. 23 is a section on line 23—23 of Fig. 21.

Figure 21:
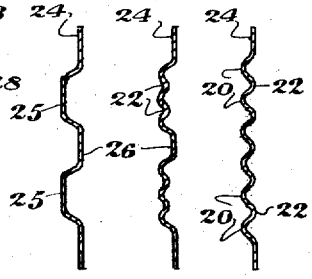
Fig. 21 is a front view of a modified form.
Figure 26:
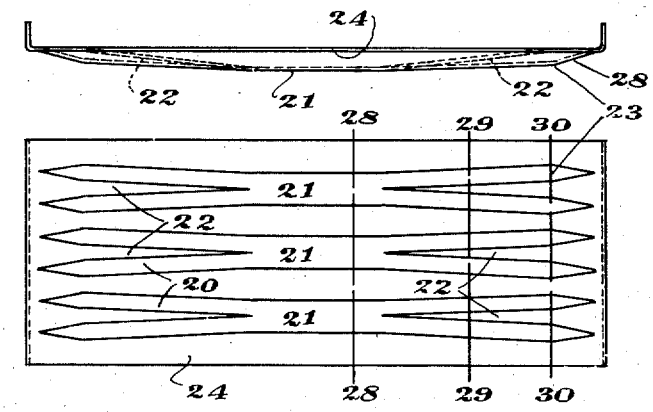
Figure 27:
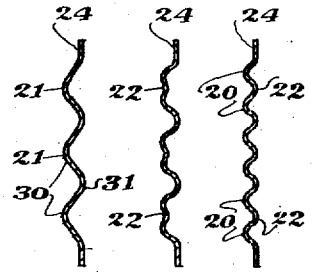

Fig. 24 is a section on line 24—24 of Fig. 21.
Fig. 25 is a section on line 25—25 of Fig. 21.
Fig. 26 is a top edge view of Fig. 27.
Fig. 27 is a front view of a modified form.
Fig. 28 is a section on line 28—28 of Fig. 26.
Fig. 29 is a section on line 29—29 of Fig. 26.
Fig. 30 is a section on line 30—30 of Fig. 26.
Like characters of reference designate like parts.

The end wall structure shown in the above figures comprises a panel composed of a corrugated metal plate or plates.

Figure 1:
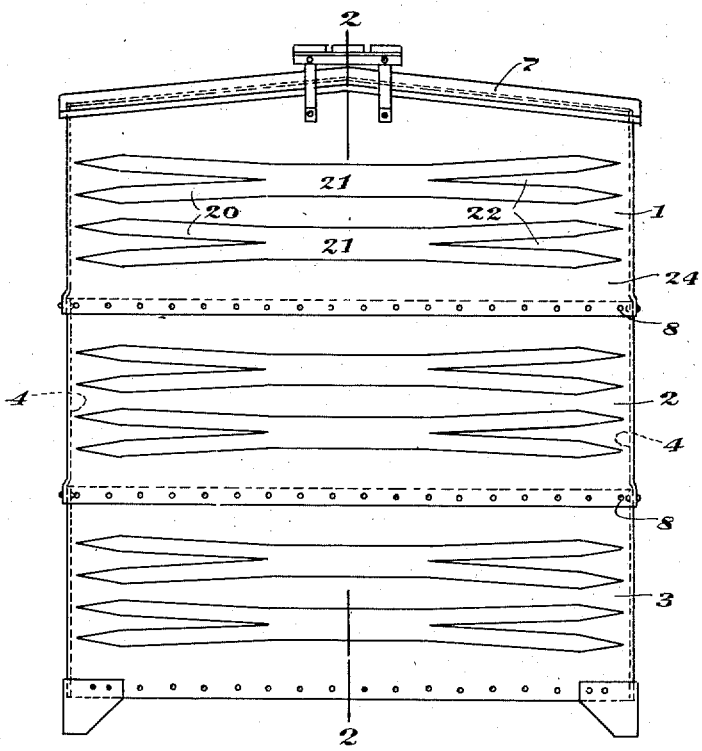
Fig. 1 is an end elevation of a box car equipped with my invention.
Figure 2:
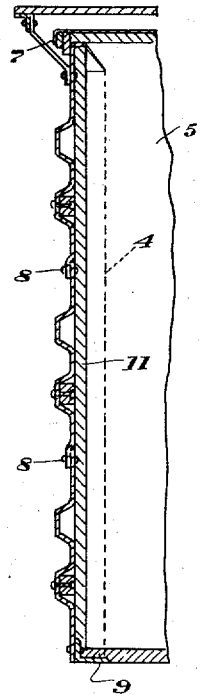
Fig. 2 is a section on line 2—2 of Fig. 1.

Referring to Figs. 1 and 2. The corrugated plates 1, 2 and 3 extend across the car from side to side and are formed with integral flanges 4 along the vertical edges which overlap and are secured to the frame members of the side walls 5 of the car by any suitable means.

The top edge of the end wall is secured beneath the fascia boards 7 and the meeting edges of the plate overlap and are secured together by rows of rivets 8 and the lower edge of the end wall is secured to the end sill 9. Nailing strips are secured to the plates 1, 2 and 3 by bolts and lining 11 is secured to the nailing strips 10.

Figure 3:
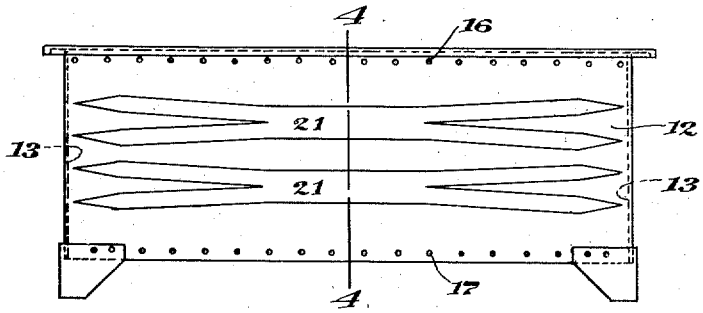
Fig. 3 is an end elevation of a gondola car equipped with my invention.
Figure 4:
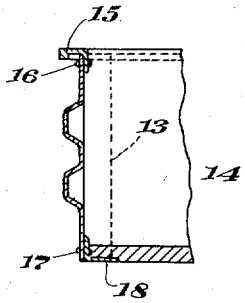
Fig. 4 is a section on line 4—4 of Fig. 3.
Figure 6:
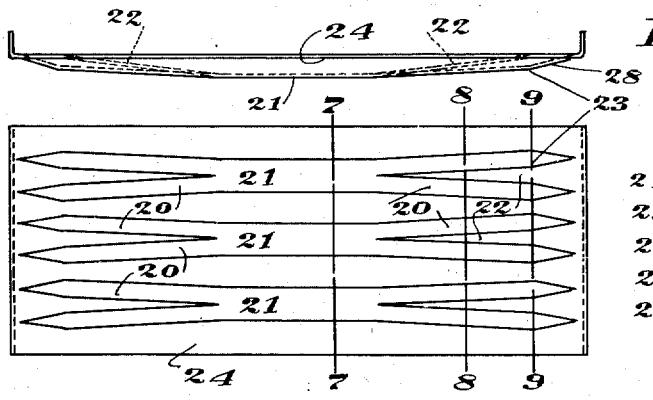
Fig. 6 is a top edge view of Fig. 5.

Figs. 3 and 4 show a modified form of the invention applied to a gondola type of car, wherein only one plate 12 is used to form the end panel which extends from side to side of the car and is provided along the vertical edges with flanges 13 which overlap and are secured to the frame members of the side walls 14 by any suitable means. The top edge of the plate is secured to the top chord 15 by rivets 16, while the lower edge is secured by rivets 17 to the end sill 18.

While the corrugations are shown pressed outwardly, and in horizontal arrangement, it is understood that the corrugations may be pressed inwardly, or partially inwardly and partially outwardly, from the original plane of the plate or the corrugations may be placed in any position; for instance, vertically or diagonally. The plates or panels may be positioned vertically or horizontally and applied to any type of railway car.

Figs. 5 to 9 inclusive show the preferred form wherein the plate is provided with a plurality of parallel embossments, each embossment comprising a plurality of relatively shallow sinuous minor corrugations 20 formed therein which are spaced apart adjacent their ends distances substantially equal to their respective widths and the part of the plate between adjacent minor corrugations is also sinuous so that these minor corrugations merge together to form a contiguous sinuous configuration symmetrical in cross section about a line midway between the outermost portions of these minor corrugations so that this line is the neutral axis of the section. Such a section is very resilient and has a spring like action under loads, and, furthermore, produces a very strong section for the amount of metal used. These minor corrugations merge into the plane of the plate by means of terminal portions of any desired formation. A plurality (two or more) of such minor corrugations 20 merge together between their opposite ends or preferably adjacent the middle of the plate (or middle of the embossment comprising the minor and major corrugations) to form a lesser number of relatively deep corrugations 21 with preferably flat apices 25 which are spaced apart distances substantially equal to their respective widths and the part 26 of the plate 24 between these major corrugations is also preferably flat, thus forming a configuration symmetrical in cross section about a line midway between the outermost portions of these major corrugations so that this line is the neutral axis of the section. Such a section is stronger and relatively rigid as compared with the section of the sinuous minor corrugations because more metal is positioned away from the neutral axis and the increased depth also increases the strength of the beam. By such an arrangement a corrugated metallic plate is provided which is relatively rigid adjacent the middle portion of the embossments and relatively resilient adjacent the opposite end portions of the embossments. The secondary oppositely projecting rib or corrugation 22 formed by the merging of the two adjacent minor corrugations 20 is equal in width to the adjacent minor corrugations at 23 and decrease in width as the minor corrugations merge together to form the major corrugation 21. These secondary oppositely projecting ribs 22 also preferably decrease in depth so that any concentrated stretch of metal is eliminated where the minor corrugations merge together.

As the embossment increases in depth toward its middle portion, this secondary rib preferably decreases in depth proportionately so that the lengths of the center lines of the metal of all cross sections of the embossment are equal to each other.

I have designed my invention for use in steel plates so that when the section modulus of any section (normal to the corrugations) is multiplied by a constant fibre stress the result equals the bending moment of that section for either a load concentrated at the middle of the beam-corrugations or for a load equally distributed over the beam-corrugations, thus showing that I have not sacrificed any required strength at the ends of the beams to obtain resiliency; in other words, by my construction I obtain a very strong beam which is also resilient. The major corrugations are preferably wider than the minor corrugations.

These shallower and deeper corrugations may be positioned and dimensioned so that the length of the center line of the metal of a cross section of the shallower corrugations (see Fig. 9) is the same as the length of the center line of the metal of a cross section of the deeper corrugations (see Fig. 7) and, furthermore, the corrugated plate may be so formed that the length of the center line of the metal of any cross section (for instance, as per Fig. 8) is equal to the length of the center line of the metal of any other cross section, that is, between the terminal portions. This is a material manufacturing advantage as it more evenly distributes the draw and stretch of the metal due to pressing the corrugations in the plate.

The major corrugations are preferably of uniform width for a short distance at the center of the plate to provide greater strength for a wider portion of the plate and also to facilitate changing the forming dies when it is desired to increase or decrease the length of the corrugations or embossments.

Figure 5:
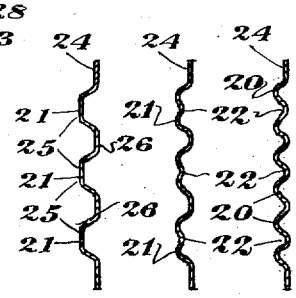
Fig. 5 is an enlarged front view of a corrugated plate.
Figure 10:
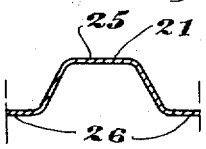
Fig. 10 is an enlarged section of a portion of the plate on line 7—7 of Fig. 5.
Figure 11:
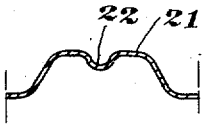
Fig. 11 is an enlarged section of a portion of the plate on line 8—8 of Fig. 5.
Figure 12:
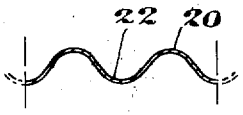
Fig. 12 is an enlarged section of a portion of the plate on line 9—9 of Fig. 5.

Figs. 10, 11 and 12 are detail enlargements of portions of the plate taken on lines 7, 8 and 9, respectively, of Fig. 5 showing the flat apex 25 of the major corrugation (Fig. 10) split or divided by the secondary corrugation 22 into two contiguous sinuous corrugations 20 (Fig. 12).

Figure 13:
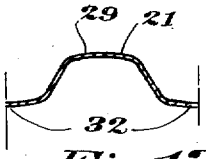
Fig. 13 is an enlarged section of a portion of the plate showing a modified form on line 7—7 of Fig. 5.
Figure 14:
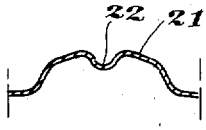
Fig. 14 is an enlarged section of a portion of the plate showing a modified form on line 8—8 of Fig. 5.
Figure 15:
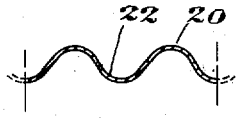
Fig. 15 is an enlarged section of a portion of the plate showing a modified form on line 9—9 of Fig. 5.
Figure 17:
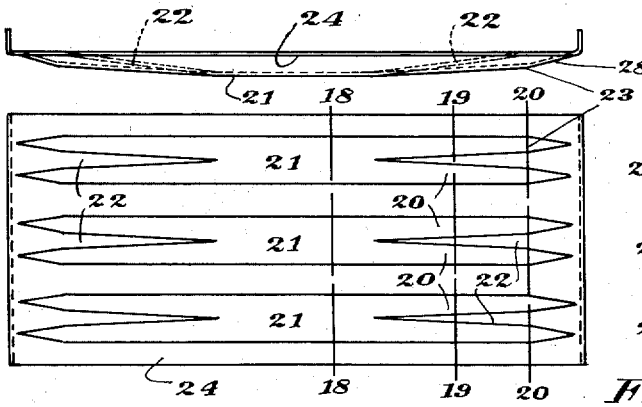
Fig. 17 is a top edge view of Fig. 16.
Figure 16:
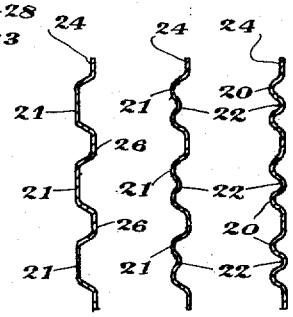
Fig. 16 is a front view of a modified form of plate.
Figure 22:
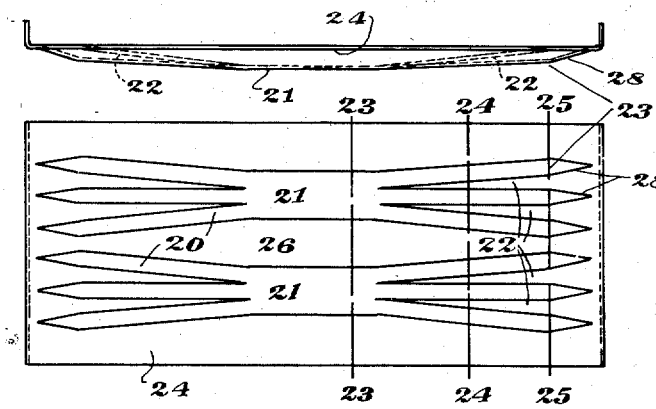
Fig. 22 is a top edge view of Fig. 21.

Figs. 13, 14 and 15 are detail enlargements of a modified form of corrugation similar to Figs. 10, 11 and 12, respectively, wherein the apex (29) of the major corrugation is arcuate.

Figs. 16 to 20 inclusive show a modification wherein the embossments have parallel sides.

Figs. 21 to 25 inclusive are similar to Figs. 5 to 9 inclusive except that they illustrate three minor corrugations merging into a single major corrugation.

Figs. 26 to 30 inclusive show a modified form wherein the major corrugations 21 have arcuate or sinuous apices 30 and the portion of the plate 31 between adjacent embossments is also arcuated or sinuous.

Plates provided with a plurality of contiguous narrow corrugations possess a considerable amount of elasticity and when struck a blow deflect readily and regain their shape without distortion, whereas a plate provided with wide flat corrugations, though better able to carry quiescent loads, has not the resiliency of the former and is more readily distorted when struck a blow.

It is, therefore, desirable to design a plate that possesses great strength to withstand the sudden impact load blows with sufficient resiliency to resist distortion.

The particular form and advantages of the terminations of the corrugations illustrated in Fig. 5 are not described or claimed specifically herein, but are described and claimed in my Patent No. 1,547,831 dated July 28, 1925, for corrugated wall elements.

This application is confined to the construction wherein the minor corrugations merge to form the major corrugation, while my application Serial No. 595,632, filed October 19, 1922, for corrugated metallic wall elements covers the construction wherein the major corrugation is split into two or more minor corrugations.

This is a division of my co-pending application Serial No. 595,634, filed October 19, 1922, as is also my application Serial No. 55,207, filed September 8, 1925.

I claim:

1. A metallic panel for railway cars having a reinforcement formed therein, comprising a plurality of stiffening ribs which merge into each other to form a relatively wider stiffening rib adjacent the center of said reinforcement, the height of said reinforcement being greatest adjacent its center and almost parallel to the first mentioned ribs.

2. A metallic plate having a plurality of corrugations terminating within said plate that merge into a lesser number of wider and deeper corrugations adjacent the center of said plate, the cross sectional area of said corrugated plate being equal anywhere between the planes where said corrugations begin to terminate into the plane of said plate.

3. A metallic plate provided with a plurality of corrugations spaced apart adjacent their ends distances substantially equal to their width, said corrugations merging between their opposite ends into a lesser number of wider and deeper corrugations spaced apart distances substantially equal to their width.

4. A metallic plate provided with a plurality of corrugations merging between their opposite ends into a lesser number of wider and deeper corrugations and almost parallel to the first mentioned corrugations.

5. A metallic plate provided with a plurality of corrugations spaced apart adjacent their ends distances substantially equal to their width, said corrugations merging between their opposite ends into a lesser number of deeper corrugations spaced apart distances substantially equal to their width.

6. A metallic plate provided with a plurality of corrugations symmetrical in cross section about a line midway between the outermost portions of the corrugations, said corrugations merging between their opposite ends into a lesser number of wider and deeper corrugations symmetrical in cross section about a line midway between the outermost portions of the corrugations.

7. A metallic plate provided with a plurality of corrugations symmetrical in cross section about a line midway between the outermost portions of the corrugations, said corrugations merging between their opposite ends into a lesser number of deeper corrugations symmetrical in cross section about a line midway between the outermost portions of the corrugations.

8. A metallic plate provided with a plurality of shallow corrugations merging between their opposite ends into a lesser number of deeper corrugations, the length of the center line of the metal of a cross section of the shallower corrugations being substantially equal to the length of the center line of the metal of a cross section of the deeper corrugations.

9. A metallic plate provided with a plurality of shallow corrugations merging between their opposite ends into a lesser number of wider and deeper corrugations, the length of the center line of the metal of a cross section of the shallower corrugations being substantially equal to the length of the center line of the metal of a cross section of the deeper corrugations.

10. A metallic plate provided with a plurality of corrugations of constant cross section for a short distance at the center of the plate which diverge into a greater number of shallower corrugations adjacent the edge of the plate.

11. A metallic plate provided with a plurality of corrugations merging between their opposite ends into a lesser number of wider and deeper corrugations, the length of the center line of the metal of any cross section of the corrugated plate being equal to the length of the center line of the metal of any other cross section.

12. A metallic plate provided with a plurality of corrugations merging between their opposite ends into a lesser number of deeper corrugations, the length of the center line of the metal of any cross section of the corrugated plate being equal to the length of the center line of the metal of any other cross section.

13. A metallic plate provided with a plurality of sinuous and contiguous corrugations, said corrugations merging between their opposite ends into a lesser number of deeper and wider corrugations with substantially flat apices.

14. A metallic plate provided with a plurality of sinuous and contiguous corrugations, said corrugations merging between their opposite ends into a lesser number of deeper corrugations with substantially flat apices.

15. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of deeper corrugations.

16. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of wider and deeper corrugations.

17. A wall for a railway car comprising a metallic plate secured to oppositely disposed frame members of the car, said plate provided with a plurality of corrugations spaced apart adjacent their ends distances substantially equal to their width with their opposite ends terminating into the plate adjacent said oppositely disposed frame members, said corrugations merging together between their opposite ends to form a lesser number of deeper corrugations spaced apart distances substantially equal to their width.

18. A wall for a railway car comprising a metallic plate secured to oppositely disposed frame members of the car, said plate provided with a plurality of corrugations spaced apart adjacent their ends distances substantially equal to their width with their opposite ends terminating into the plate adjacent said oppositely disposed frame members, said corrugations merging together between their opposite ends to form a lesser number of wider and deeper corrugations spaced apart distances substantially equal to their width.

19. A wall for a railway car comprising a metallic plate secured to oppositely disposed frame members of the car, said plate provided with a plurality of corrugations symmetrical in cross section about a line midway between the outermost portions of the corrugations with their opposite ends terminating into the plate adjacent said oppositely disposed frame members, said corrugations merging together between their opposite ends to form a lesser number of deeper corrugations, symmetrical in cross section about a line midway between the outermost portions of the corrugations.

20. A wall for a railway car comprising a metallic plate secured to oppositely disposed frame members of the car, said plates provided with a plurality of corrugations symmetrical in cross section about a line midway between the outermost portions of the corrugations with their opposite ends terminating into the plate adjacent said oppositely disposed frame members, said corrugations merging together between their opposite ends to form a lesser number of wider and deeper corrugations symmetrical in cross section about a line midway between the outermost portions of the corrugations.

21. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of wider and deeper corrugations, the length of the center line of the metal of a cross section of the shallower corrugations being substantially equal to the length of the center line of the metal of a cross section of the deeper corrugations.

22. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of deeper corrugations which are of constant cross section for a short distance at the center of the plate.

23. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of wider and deeper corrugations which are of constant cross section for a short distance at the center of the plate.

24. A wall for a railway car comprising a metallic plate secured to oppositely disposed frame members of the car, said plate provided with a plurality of sinuous and contiguous corrugations with their opposite ends terminating into the plate adjacent said oppositely disposed frame members, said corrugations merging together between their opposite ends to form a lesser number of deeper corrugations with substantially flat apices.

25. A wall for a railway car comprising a metallic plate secured to oppositely disposed frame members of the car, said plate provided with a plurality of sinuous and contiguous corrugations with their opposite ends terminating into the plate adjacent said oppositely disposed frame members, said corrugations merging together between their opposite ends to form a lesser number of wider and deeper corrugations with substantially flat apices.

26. A wall for a railway car comprising a metallic plate secured to oppositely disposed frame members of the car, said plate provided with a plurality of corrugations with their opposite ends terminating into the plate adjacent said oppositely disposed frame members, said corrugations merging together between their opposite ends to form a lesser number of deeper corrugations, the length of the center line of the metal of a cross section of the shallower corrugations being substantially equal to the length of the center line of the metal of a cross section of the deeper corrugations.

27. A metallic plate for a railway car structure having a reinforcement formed therein, comprising a plurality of stiffening ribs which merge into each other between their opposite ends to form a relatively wider stiffening rib, substantially parallel to the first mentioned ribs, said reinforcement decreasing in depth toward its opposite ends.

28. A metallic plate for a railway car structure having a reinforcement formed therein, comprising a plurality of stiffening ribs which merge into each other between their opposite ends to form a stiffening rib substantially parallel to the first mentioned ribs, said reinforcement decreasing in depth toward its opposite ends.

29. A metallic panel formed with a plurality of corrugations that merge between their opposite ends into a plurality of fewer corrugations substantially parallel to the first mentioned corrugations, said corrugations decreasing in depth toward their opposite ends.

30. In a railway car structure a metallic plate formed with a plurality of varying depth corrugations which have their ends divided so as to provide a relatively rigid structure adjacent the middle of the corrugations, and a relatively resilient structure adjacent the ends of the corrugations.

31. In a railway car structure a metallic plate formed with a plurality of varying depth corrugations which have their ends divided so as to provide a relatively rigid structure adjacent the middle of the corrugations which gradually becomes a relatively resilient structure adjacent the ends of the corrugations.

32. In a railway car structure a metallic plate formed with a plurality of corrugations which are relatively deep adjacent their middle portions, said corrugations having their opposite ends divided to form a greater number of relatively shallow corrugations adjacent their end portions so as to provide a relatively rigid structure adjacent the middle of the corrugations and a relatively resilient structure adjacent the ends of the corrugations.

33. In a railway car structure a metallic plate formed with a plurality of corrugations which are relatively deep adjacent their middle portions, said corrugations having their opposite ends divided to form a greater number of relatively shallow corrugations adjacent their end portions, so as to provide a relatively rigid structure adjacent the middle of the corrugations which gradually becomes a relatively resilient structure adjacent the ends of the corrugations.

34. In a railway car structure a metallic plate formed with a plurality of corrugations which are relatively deep and relatively wide adjacent their middle portions, said corrugations having their opposite ends divided to form a greater number of relatively shallow and relatively narrow corrugations adjacent their end portions, so as to provide a relatively rigid structure adjacent the middle of the corrugations, and a relatively resilient structure adjacent the ends of the corrugations.

35. In a railway car structure a metallic plate formed with a plurality of corrugations which are relatively deep and relatively wide adjacent their middle portions, said corrugations having their opposite ends divided to form a greater number of relatively shallow and relatively narrow corrugations adjacent their end portions, so as to provide a relatively rigid structure adjacent the middle of the corrugations which gradually becomes a relatively resilient structure adjacent the ends of the corrugations.

36. A metallic plate formed with a plurality of sinuous embossments, with the parts of the plate between the embossments also of sinuous configuration, said embossments merging together between their opposite ends to form a plurality of fewer wider and deeper embossments.

37 A metallic plate formed with a plurality of sinuous embossments, with the parts of the plate between the embossments also of sinuous configuration, said embossments merging together between their opposite ends to form a plurality of fewer deeper embossments.

38. A metallic plate provided with a plurality of sinuous corrugations with the parts of the plate between said corrugations also of sinuous configuration, said corrugations merging together between their opposite ends to form a plurality of fewer deeper corrugations having substantially flat apices.

39. A metallic plate provided with a plurailty of sinuous corrugations with the parts of the plate between said corrugations also of sinuous configuration, said corrugations merging together between their opposite ends to form a plurality of fewer deeper corrugations having substantially flat apices, with the parts of the plate between the last mentioned corrugations also being flat.

40. A metallic wall structure for a railway car comprising a metallic plate secured to oppositely disposed frame members of the car, said plate provided with a plurality of sinuous corrugations, with the parts of the plate between said corrugations also of sinuous configuration, said corrugations merging together between their opposite ends to form a plurality of fewer wider and deeper corrugations which terminate into the plate adjacent said oppositely disposed frame members having substantially flat apices.

41. A metallic wall structure for a railway car comprising a metallic plate secured to oppositely disposed frame members of the car, said plate provided with a plurality of sinuous corrugations, with the parts of the plate between said corrugations also of sinuous configuration, said corrugations merging together between their opposite ends to form a plurality of fewer wider and deeper corrugations which terminate into the plate adjacent said oppositely disposed frame members having substantially flat apices, with the parts of the plate between the last mentioned corrugations also being flat.

ARTHUR E. SMALL.